MAGNETIC-CORE LOGIC AND STORAGE DEVICE

Filed Jan. 30, 1961 2 Sheets-Sheet 1

INVENTOR.
ALFRED E. BRAIN
BY Lyon & Lyon
ATTORNEYS.

INVENTOR.
ALFRED E. BRAIN
BY Lyon & Lyon
ATTORNEYS.

United States Patent Office
3,196,415
Patented July 20, 1965

3,196,415

MAGNETIC-CORE LOGIC AND STORAGE DEVICE

Alfred E. Brain, Menlo Park, Calif., assignor to Stanford Research Institute, Palo Alto, Calif., a corporation of California Filed Jan. 30, 1961, Ser. No. 85,887
5 Claims. (Cl. 340—174)

This invention relates to circuits for performing logical operations and, more particularly, to an improved magnetic-core logic circuit.

One of the logical functions sought to be achieved by using electronic circuits is that of a neural element. In the simulation of neural elements by electrical networks some characteristic electrical operations recur with considerable regularity and form the building blocks from which comprehensive simulations may be devised. These operations are those of multilevel storage, wherein the strength of an output signal is dependent upon the previous history of the neural element, a gating function wherein a signal may or may not be present, depending upon the presence of controlling signals, and a controlling threshold level wherein a signal is gated either on or off, depending upon whether the signal level at some point exceeds a controlling threshold level, and, finally, the function of summation wherein a set of signals is added together to form an input which, for example, may be compared with a gating level.

An object of this invention is the provision of a novel arrangement for simulating the circuitry of a neural element.

Another object of this invention is the provision of a circuit employing magnetic cores wherein the operation of a neural element is simulated.

Still another object of the present invention is the provision of a simpler circuit for performing the logical functions involved in neural simulation than has been achieved heretofore.

These and other objects of the invention are achieved in an arrangement wherein two magnetic cores are employed. The first of these two cores is biased with a threshold bias which must be overcome before the magnetic-core material can be switched. Gating signals may be summed for the purpose of overcoming this threshold bias for switching the core. Signals for storage in the second core, may be applied to the first core in a manner so that they will not be transferred for storage until the first core magnetic material has been switched.

A transfer winding couples the first and second cores in a manner so that when the first core has been switched the signals applied thereto for storage are transferred and applied to the second core. The second core is biased in a manner to provide analog storage of any signals which are applied thereto. For readout purposes, an alternating-current signal is applied to the first core and a coupling winding couples the first core to the second core in a manner so that alternating-current signals are applied to the second core only when the first core is switched. The alternating-current signals are applied to the second core in a manner so that a nondestructive readout of the signals is provided. The amplitude of the output signal which is derived from the second core represents the sum of all the signals which have been stored therein.

The novel features that are considered characteristic of this invention are set forth with particularity in the appended claims. The invention itself, both as to its organization and method of operation, as well as additional objects and advantages thereof, will best be understood from the following description when read in connection with the accompanying drawings in which:

Figure 1:
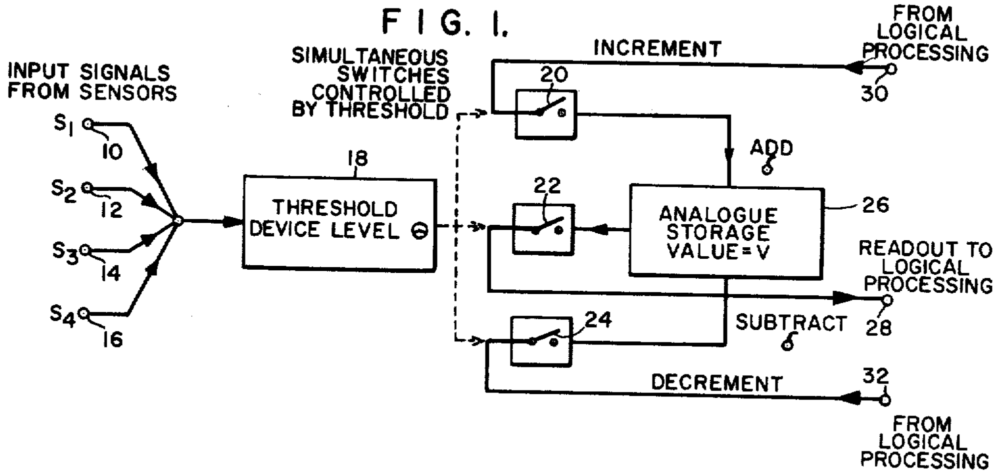
FIGURE 1 is a block diagram of an electrical simulation circuit for a neural element.

Reference is now made to FIGURE 1, which shows one possible arrangement for electrically simulating the operation of a neural element. A plurality of signals is applied to terminals 10, 12, 14, and 16. These signals are summed in any known manner to provide an input signal which is the total of the plurality of inputs. The total signal is compared with the value of a level which is set by a threshold device 18. If the level of the threshold device is exceeded, the threshold device can then close three normally open contacts 20, 22, 24. The unit is then said to be active.

A signal level proportional to the stored weight of signals of value V, is read out from the analog storage 26 over the contacts 22, which now connect the analog storage to the output terminal 28. Signals, which it is desired to enter into the analog storage, are applied to a terminal 30 and can be entered over the contacts 20 when they are closed. Signals, which it is desired to subtract from the analog storage, are applied to terminal 32 and can be applied to the analog storage to be subtracted therefrom over the contacts 24 when closed.

Figure 2:
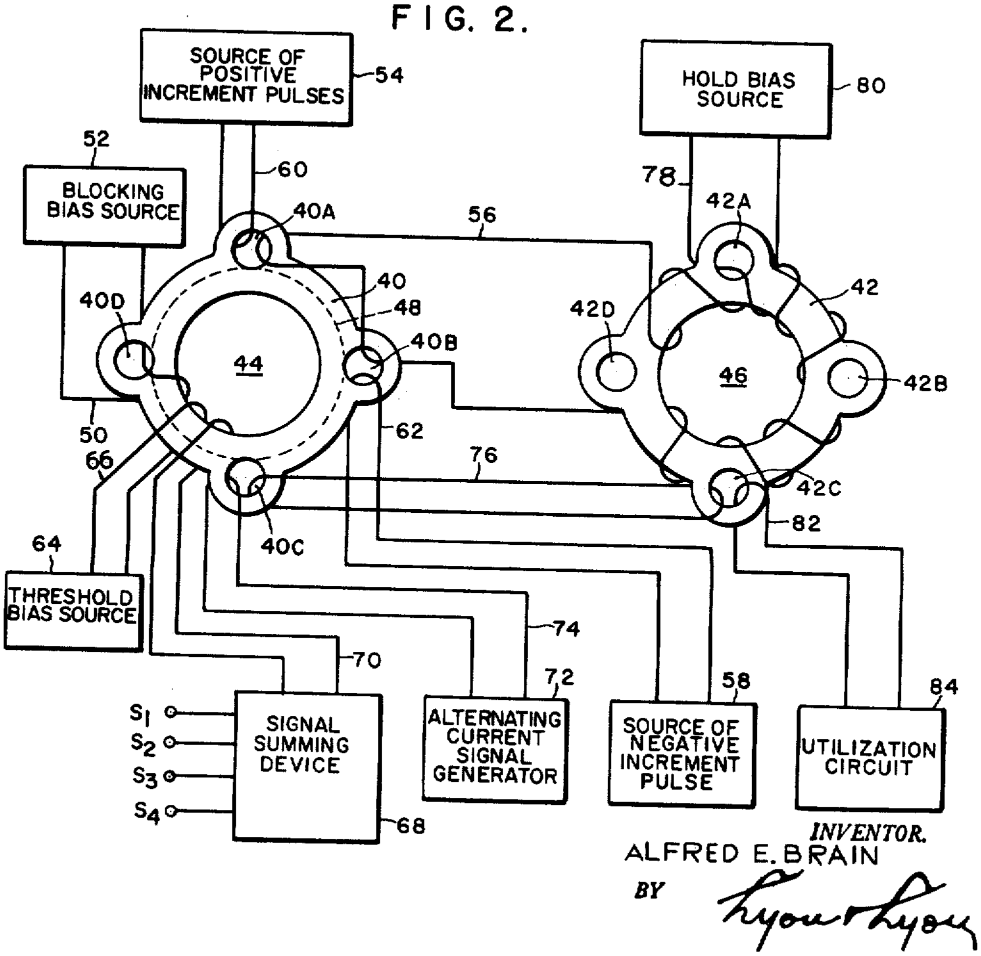
FIGURE 2 is a circuit diagram of an embodiment of the invention.

Reference is now made to FIGURE 2 of the drawings, which is a circuit diagram of an embodiment of the invention. This comprises two magnetic cores 40, 42 of a type known as multiaperture magnetic cores, wherein the cores have a substantially annular shape with a central aperture, respectively 44, 46. In the annulus of each core there is a plurality of small apertures, respectively 40A, 40B, 40C, and 40D for core 40, and for core 42, respectively 42A, 42B, 42C, and 42D.

Multiaperture ferrite cores of the type presented in FIGURE 2 have certain characteristics which enable one of these cores 40 to be employed for gating purposes and another of these cores 42 to be employed for analog storage purposes. The core 40 may be considered to have two flux paths. A first of these circulates around the main aperture 44 through the ferrite magnetic material which is included within the dotted circle 48. This is the magnetic material comprising the region between the small apertures 40A through 40D and the main aperture 44. A second flux path may be said to exist in the remaining ferrite material which is outside of the dotted circle. The magnetic material of which the core is made may be said to have two states of magnetic remanence. The magnetic material may be switched from one to the other state by applying a magnetomotive force thereto by means of a winding inductively coupled to the magnetic core through its main aperture. However, it has been found that, by means of a blocking winding 50 excited from a blocking bias source 52 and inductively coupled to the core 40 by passing through its small aperture 40D around the inner leg of magnetic material (between the small aperture and the main aperture), it is possible to hold the magnetic material in the first flux path (inner ring) in one state of magnetic remanence, while the magnetic material in the second flux path is driven to its other state of magnetic remanence.

Another well-known characteristic of magnetic cores is that signals applied to one of the small apertures by means of one winding will not be transmitted through a second winding coupled to the core through that small aperture as long as the magnetic material on both sides of the aperture, or in the first and second flux paths, have the same state of magnetic remanence. It is only when the states of magnetic remanence differ, or also referred to as when the flux circulates in opposite directions around the aperture, that a signal transmission can occur from one winding which is coupled to the magnetic material around that aperture to another winding coupled to the magnetic material around that aperture.

Accordingly, when the magnetic core 40, which operates as a gate, is in that condition of magnetic remanence whereby the flux in both first and second flux paths is circulating in one direction, or when the magnetic material, of which the total core is made, is still all in one state of magnetic remanence, it may be stated that the core gate is blocking the transfer of signals. Further, signals from a source of positive increment pulses 54 will not be applied to a transfer winding 56 neither will signals from a source of negative increment pulses 58, as long as the gate core 40 is in its blocked state. The source of positive increment pulses is applied to the core material surrounding the small aperture 40A through a winding 60 which is coupled to the core material through the small aperture 40A. The pulses from the source of negative increment pulses 58 are applied to the core material surrounding the aperture 40B by means of a winding 62 inductively coupled to the magnetic core through the small aperture 40B.

As previously indicated, the magnetic material forming the first flux path is maintained in its state of magnetic remanence by means of a blocking winding 50, which is coupled to the magnetic core 40 through the small aperture 40D and is wound around the inner leg of material between the small aperture 40D and the main aperture 44. Before the core 40 can be switched, a threshold bias must be exceeded by the gating signals. The threshold bias is provided by a threshold bias source of potential 64, which causes current to flow through a threshold winding 66. The threshold winding is inductively coupled through the magnetic core 40 by passing around the annulus thereof through the main aperture. A plurality of signals S1 through S4 are applied to a signal-summing device 68. The output of the signal-summing device is applied to an input, or gating, winding 70. This winding is inductively coupled to the annulus of the core 44 through its main aperture. An alternating-current signal is applied from a source 72 to a winding 74, inductively coupled to the magnetic material surrounding the small aperture 40C through that small aperture. A winding 76 is inductively coupled between cores 40 and 42 through their small apertures 40C, 42C.

The analog storage core 42 also has a winding 78, which is inductively coupled to the core of material through the aperture 42A and, more specifically, is wound around the inner leg of material. This winding is excited from a hold bias source 80. Accordingly, the magnetic material which comprises the first, or inner, flux path of core 42 is maintained against being switched in response to signals received over the winding 56, which is inductively coupled to the annulus of core 42 and is wound through its central aperture. An output winding 82 is coupled to the magnetic core 42 through the small aperture 42C. This output winding is connected to a utilization circuit 84.

The magnetic material comprising the second flux path in the core 42 is incrementally switched in response to either positive or negative increment pulses. The positive-increment pulses drive the magnetic material toward one state of magnetic saturation, and the negative-increment pulses drive the magnetic material toward the opposite state of magnetic saturation. It should be noted, however, that these drives are incremental, and the response of the core to these drives is also an incremental one. The amplitude of the alternating current signal in the output winding 82 in response to the excitation supplied over the winding 76 is determined by the quantity of magnetic material which is being switched. The further the magnetic material in the second flux path in core 42 is switched away from the state of remanence of the magnetic material in the first flux path, held by the winding 78, the larger the amplitude of the signal in the output winding 82.

The signal-summing device 68 can switch the magnetic core to a condition wherein the signals from either the source of positive-increment pulses or the source of negative-increment pulses are applied over the transfer winding 56 to the storage core 42. The threshold bias source 64 serves to close the gate core 40 to the transmission of these signals when the signals from the signal-summing device are removed or are less than the required threshold. Signals from the alternating-current signal generator 72 are transferred to provide an indication of the level of the storage in the storage core 42 whenever the gate core is rendered operative to the transfer signals.

By way of summary of the operation of the embodiment of the invention shown in FIGURE 2, the blocking bias source prevents switching of flux in the inner ring of material of the core 40. The threshold bias source 64 establishes a level of bias which must be exceeded by signals received from the signal summing device 68 in order to enable flux to be switched about the outer flux path of the core 40, which is the portion of the core which substantially is outside of the circle represented by the dotted line circle 48.

As has been described, it is only when flux between the inner and outer flux paths of the core are established in opposite directions that transfer of current can be made between the winding 60 fed by the source of positive increment pulses and the transfer winding 56, and between the winding 62 fed by the source of negative increment pulses and the winding 56. Current which is supplied by the signal summing device 68 serves the function, when of sufficient amplitude, to overcome the holding operation of the threshold bias source 64 whereby flux around the outer ring of ferrite material of the core 40 is reversed so that it is in a direction opposite to the flux within the inner ring or flux path of the core 40. The blocking bias source 52 insures that the flux in the inner ring of the core 40 remains unaffected by the magneto-motive force provided by signal summing device 68.

Upon the removal of the magneto-motive force provided by the signal summing device 68, the threshold bias source 64 restores the flux in the outer flux path of the core 40 to its initial state whereby there will be no transfer of pulses from the winding 60 to winding 56 or from the winding 62 to the winding 56. When a transfer of pulses to the analog core is desired then a magneto-motive force which exceeds the threshold bias source must be applied by the signal summing device 68 and must be maintained while the positive incremental pulses or negative incremental pulses are applied. Should both the positive and negative pulses occur simultaneously at this time, then the resultant of these will be applied to the analog storage core.

The hold bias source 80 serves the function of preventing the flux in the inner ring of material of the core 42 from being switched despite the application of pulses from either the source of positive increment pulses or the source of negative increment pulses. Since there is no threshold bias applied to maintain or restore the outer flux path of the core 42, it will respond to the current pulses being applied thereto over the winding 56 to either increment or decrement the magnetic flux in this outer flux path.

It will be noted that current from an alternating current signal generator 72 is applied to the aperture 40C of the core 40 over a winding 74. A coupling winding 76 couples aperture 40C to aperture 42C of the core 42. A utilization circuit 84 is coupled by means of a winding 82 to the aperture 42C. What has been stated in connection with prevention of transfer of current between windings 60 and 62 and the transfer winding 56, applies to the transfer of current between winding 74 and the winding 76. The only time such transfer of alternating current can occur is when the magneto-motive force applied by the signal summing device 68 exceeds the threshold bias. At this time an alternating current is induced in the winding 76.

The amplitude of the current induced, as a result, in the winding 82 depends upon the level of the storage in the outer ring of magnetic material in the core 42. Stated another way, positive increment pulses tend to reverse more and more flux in the outer ring of magnetic material in the core 42 while negative increment pulses tend to reduce the amount of flux reversed and to restore the direction of flux as that to which the flux in the inner ring is held by the hold bias source 80. The amount of current transferred between the winding 76 and the winding 82 through the magnetic material around the aperture 40C is determined by the amount of flux reversed and thus by the storage state of the analog storage core 42.

The similarity between the arrangement shown in FIGURE 1 and the arrangement shown in FIGURE 2 should become clear at this point. When the signal summing device exceeds the level set by the threshold bias source then the core 40 which corresponds to the three switches 20, 22, 24 enables either positive increments or negative increments to be entered into the analog storage device or core 42 and simultaneously therewith a readout of the state of storage of the analog core is provided. As soon as the threshold bias is greater than the input from the signal summing device the core 40 is blocked corresponding to the opening of the three switches 20, 22, 24.

In an embodiment of the invention which has been built employing multiaperture magnetic cores, by way of example and not to be considered as a limitation upon the invention, the blocking winding 50 had seven turns and 230 milliamperes of current were applied. The threshold winding had 20 turns and 60 milliamperes of current were applied. The input winding 70 had 50 turns and the winding over which alternating-current signals were applied had five turns. The alternating-current signal generator supplied signals having a frequency of 75 kilocycles. The winding 76 had three turns on each one of the cores. The output winding 82 had five turns. The hold winding 78 had six turns and 300 milliamperes of current were applied thereto. If desired, the input winding 70 may be applied to the core through one of the small apertures and wound around an outer leg of material. The reason that this is not preferred, however, is that this requires a large number of winding being applied to the core through one of the smaller apertures, which is difficult and therefore undesirable.

The circuit shown in FIGURE 2 operates substantially linearly over those regions in which the core material is not positively or negatively saturated. It may be desirable to gate off the alternating-current signal at the time a positive or negative increment pulse is being transferred into the analog core, since this may affect the amplitude of the storage in response to the increment, since the size of the increment depends upon the vector sum of a switching pulse and the carrier. Alternative to this, the entry or application of an increment pulse to the storage core should always occur at a constant-reference phase with respect to the carrier drive, in which case the effect of the carrier drive can be disregarded.

It has been found possible to extract more direct current from a winding through a minor aperture than necessary to operate a control winding of the same gate core. By the application of the so-extracted direct current to the gate winding, one is enabled to obtain an arrangement which exhibits two stable states and corresponds in function to a self-holding relay, with the remaining minor apertures being available for other functions, if needed, in the manner of independent contacts.

Figure 3:
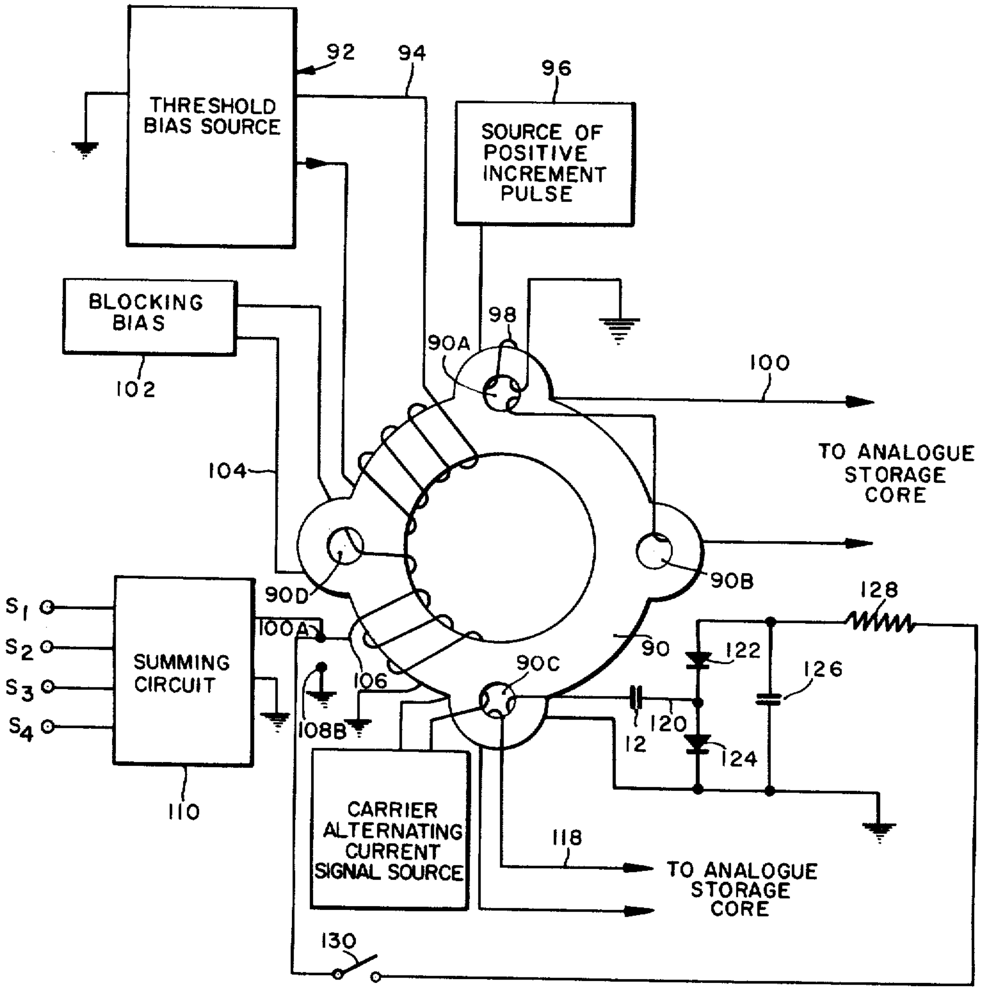
FIGURE 3 is a circuit diagram showing another arrangement of a gating core and windings which may be employed with the embodiment of the invention.

FIGURE 3 shows a magnetic core 90 which is identical to those shown in FIGURE 2. This core may be operated as a gate core, similar to the core 40 of FIGURE 2. However, the gate here has two stable states. A threshold bias source 92 applies a threshold bias current to a winding 94, which is inductively coupled to the core 90 through its main aperture. A source of positive increment pulses 96 are applied to an input winding 98 to be transferred when the core 90 is switched. A transfer winding 100 functions identically as transfer winding 56 in FIGURE 2 to transfer any increment pulses to a following analog storage core (not shown) whenever the core 90 is unblocked. The blocking bias 102 applies current to a blocking winding 104 which is inductively coupled to the core 90 through the small aperture 90D. The input winding 106, to which gating signals are applied, is inductively coupled to the core 90 through its main aperture. This winding is connected to terminals 108A, 108B. The summing circuit 110 applies signals to the terminals 108A, 108B, which can switch the core 90 in the manner previously described in FIGURE 2 whenever the summing signals S1, S2, S3, S4, which are applied to the input of the summing circuit, exceed the threshold bias. An alternating-current signal source 114 applies current over a winding 116 to the magnetic material surrounding the minor aperture 90C. A winding 118 is coupled to one of the small apertures of an analog storage core (not shown).

A winding 120 is also coupled to the minor aperture 90C for the purpose of deriving alternating-current signals (on the order of 500 kc. per second) when the gating core 90 is unblocked. This winding is connected to a rectifying network including first and second diodes 122, 124, which are connected across a capacitor 126. A resistor 128 connects the junction of diode 122 and capacitor 126 to the terminal 108A. The other side of capacitor 126 is connected to ground.

In operation, whenever a signal received from the summing circuit exceeds the bias of the threshold bias source 92, the magnetic core 90 is unblocked. As a result, alternating-current signals from the source 114 are transferred through the core materials surrounding the aperture 90C to the winding 120. These signals are rectified by the network including the diodes 122, 124 and the capacitor 126. These signals are then applied back to the gating signal winding 106 for the purpose of maintaining the magnetic core 90 in its unblocked state. In order to reset the gating core 90 to its blocked state, a switch 130 is shown in the connection between the resistor 128 and terminal 108A. This switch is momentarily opened, whereby the bias source 92 can drive the core 90 back to its blocked state. The switch 130 is representative of any suitable means for either opening the connections or momentarily gating off the carrier signals applied by the source 114.

There has accordingly been described and shown herein a novel and useful circuit arrangement employing magnetic cores which is capable of performing logical functions including these displayed by a neural element.

I claim:

1. A magnetic core logic circuit comprising a normally blocked magnetic core gate means, a magnetic core analog storage means, means for applying signals to be stored in said magnetic core analog storage means to said normally blocked magnetic core gate means, means for applying an unblocking signal to said normally blocked magnetic core gate means, means coupling said normally blocked magnetic core gate means to said magnetic core analog storage means for storing said signals to be stored in said magnetic core analog storage means when said normally blocked magnetic core gate means is unblocked, means for applying alternating-current signals to said normally blocked magnetic core gate means, and means coupling said normally blocked magnetic core gate means and said magnetic core analog storage means for deriving an output signal indicative of the state of storage from said magnetic core analog storage means responsive to said alternate-current signals when said magnetic core gate means is unblocked.

2. A magnetic core logic circuit comprising a first and a second core each made of magnetic material having at least two states of magnetic remanence, each core being in the form of an annular ring and having a central large aperture and a plurality of small apertures in the annulus of said core whereby a first magnetic flux path is provided in each said core which includes the inner ring of material of said core substantially between said small apertures and said central aperture, and a second magnetic flux path is provided which includes the remaining material of said core, means for applying a threshold bias to said first core which must be exceeded for driving the material of said core from one to the other state of magnetic remanence, means for applying a bias to said first core for maintaining the material in one of said two flux paths in one of said two states of remanence, means for applying signals to be stored in said second core to said first core, means for applying gating signals to said first core for driving the material in the other of said two flux paths to the other of said two states of remanence whereby said signals to be stored may be transferred to said second core, means for transferring said signals to be stored from said first to said second core, and means for nondestructively reading the storage state of said second core.

3. A magnetic core logic comprising a first and a second core each made of magnetic material, each having at least two states of magnetic remanence, each core being in the form of an annular ring and having a central large aperture and a plurality of small apertures in the annulus of said core whereby a first magnetic flux path is provided in each said core which includes the inner ring of material of said core substantially between said small apertures and said central apertures, and a second magnetic flux path is provided which includes the remaining material of said core, means for applying biasing magnetomotive forces to said first core for maintaining the core material in said first and second flux paths in the same one of said two states of magnetic remanence, means for applying signal magnetomotive forces to said first core for driving the core material in one of said first and second flux paths to the other of said two states of magnetic remanence, means for applying biasing magnetomotive forces to the material forming the first flux path of said second core for maintaining it in one of said two states of magnetic remanence, means for applying incremental signals to the magnetic material around one of the small apertures of said first core transfer winding, means responsive to said means for applying incremental signals coupled between said one of the small apertures and said second core for applying a magnetomotive drive to said second core when the magnetic material in said first core first and second flux paths are in different states of magnetic remanence, and means coupled to another of the small apertures of said first and second cores for producing an output signal having an amplitude representative of the extent to which the magnetic material in one of said first and second flux paths of said second core has been driven from said one of said two states of magnetic remanence responsive to the drive applied by said means responsive to said means for applying incremental signals which is coupled between one of said small apertures and said second core.

4. A magnetic core logic circuit comprising a first and a second core each made of magnetic material having at least two states of magnetic remanence, each core being in the form of an annular ring and having a central large aperture and a plurality of small apertures in the annulus of said core whereby a first magnetic flux path is provided in each said core which includes the inner ring of material of said core substantially between said small apertures and said central aperture, and a second magnetic flux path is provided which includes the remaining material of said core, means for establishing a threshold bias for said first core including a threshold bias winding inductively coupled to said first core through its central aperture, and a blocking bias winding inductively coupled to said first core through one of said small apertures, means for driving the core material in one of said flux paths from one to the other state of magnetic remanence including a gating signal input winding inductively coupled to said first core through its central aperture, means for entering signals into said second core including a signal input winding coupled to said first core through a second one of its small apertures, a signal transfer winding coupled to said first core through said second one of said small apertures and to said second core through its main aperture, and a holding winding coupled to said second core through one of its small apertures, and means for obtaining a signal representative of the signals stored in said second core comprising a winding coupled to said first core through a third one of its small apertures to said second core through a second one of its small apertures, winding means for applying an alternating-current signal to the material around said third one of the small apertures, and a winding coupled to said second core through said second one of said small apertures wherein an output signal is induced.

5. A circuit as recited in claim 4 wherein there is included a winding coupled through said third one of said apertures to said first core for deriving an alternating-current output responsive to said winding means for applying an alternating current, means for rectifying the alternating-current output derived by said winding and means for applying the output of said means for rectifying to said gating signal input winding.

References Cited by the Examiner

UNITED STATES PATENTS 3,004,244 10/61 Crane ---------------- 340—174

IRVING L. SRAGOW, *Primary Examiner.*

JOHN T. BURNS, *Examiner.*